United States Patent
Dutta et al.

(10) Patent No.: US 9,688,181 B2
(45) Date of Patent: Jun. 27, 2017

(54) CONTROL METHOD FOR A HYBRID REFRIGERATION SYSTEM

(71) Applicant: THERMO KING CORPORATION, Minneapolis, MN (US)

(72) Inventors: Samvit Dutta, Galway (IE); Herman H. Viegas, Bloomington, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/900,065

(22) PCT Filed: Jun. 18, 2014

(86) PCT No.: PCT/US2014/042975
§ 371 (c)(1),
(2) Date: Dec. 18, 2015

(87) PCT Pub. No.: WO2014/205095
PCT Pub. Date: Dec. 24, 2014

(65) Prior Publication Data
US 2016/0144764 A1    May 26, 2016

Related U.S. Application Data

(60) Provisional application No. 61/836,441, filed on Jun. 18, 2013.

(51) Int. Cl.
*B60P 3/20*  (2006.01)
*B60H 1/00*  (2006.01)
(Continued)

(52) U.S. Cl.
CPC .............. *B60P 3/20* (2013.01); *B60H 1/005* (2013.01); *B60H 1/00364* (2013.01);
(Continued)

(58) Field of Classification Search
CPC ..... B60P 3/20; B60H 1/0065; B60H 1/00592; B60H 1/005
(Continued)

(56) References Cited

U.S. PATENT DOCUMENTS 2,875,595 A    3/1959  Kleist
3,006,167 A    10/1961 Lorch
(Continued)

FOREIGN PATENT DOCUMENTS

CN    1492195      4/2004
CN    101002062 U  8/2007
(Continued)

OTHER PUBLICATIONS

International Search Report for International Application No. PCT/US2014/042894, dated Oct. 13, 2014 (3 pages).
(Continued)

*Primary Examiner* — Ljiljana Ciric
*Assistant Examiner* — Alexis Cox
(74) *Attorney, Agent, or Firm* — Hamre, Schumann, Mueller & Larson, P.C.

(57) ABSTRACT

A method for controlling a transport refrigeration system (TRS) for refrigeration of a transport unit is disclosed. The TRS includes a TRS controller connected to the TRS for operating the TRS, a eutectic device including a eutectic medium, a transport refrigeration unit (TRU) having a refrigerant circuit for directing a refrigerant fluid there through, and a cooling fluid circuit in thermal contact with the eutectic medium for directing a cooling fluid to be in thermal contact with the eutectic medium. The method includes the TRS controller receiving a selection of a cooling mode for the TRS, and cooling an inside of a transport unit according to the cooling mode selected. The cooling includes one or more of a first cooling type and a
(Continued)

second cooling type. The cooling mode for the TRS includes a manual cooling mode, a local automatic cooling mode, a dynamic cooling mode, and a preset cooling mode.

9 Claims, 10 Drawing Sheets

(51) Int. Cl.
*B60H 1/32* (2006.01)
*F25D 3/00* (2006.01)
*F25D 11/00* (2006.01)
*F25D 29/00* (2006.01)
*F24F 5/00* (2006.01)

(52) U.S. Cl.
CPC ....... *B60H 1/00964* (2013.01); *B60H 1/3202* (2013.01); *F25D 3/005* (2013.01); *F25D 11/006* (2013.01); *F25D 29/003* (2013.01); *F24F 2005/0039* (2013.01)

(58) Field of Classification Search
IPC ........................................................ B60P 3/20
See application file for complete search history.

(56) References Cited

U.S. PATENT DOCUMENTS

| | | | |
|---|---|---|---|
| 3,156,101 A * | 11/1964 | McGuffey | F25B 25/005 62/175 |
| 3,159,982 A * | 12/1964 | Schachner | B60P 3/20 62/175 |
| 3,633,381 A | 1/1972 | Haaf et al. | |
| 3,744,271 A | 7/1973 | Franklin | |
| 3,788,093 A * | 1/1974 | Lauterbach | F25B 41/04 62/200 |
| 3,845,638 A | 11/1974 | Apple et al. | |
| 4,658,593 A | 4/1987 | Stenvinkel | |
| 4,712,387 A | 12/1987 | James et al. | |
| 4,719,028 A | 1/1988 | James et al. | |
| 4,856,285 A | 8/1989 | Acharya et al. | |
| 5,239,839 A | 8/1993 | James | |
| 5,272,887 A | 12/1993 | Zendzian, Sr. | |
| 5,548,967 A | 8/1996 | Ghiraldi | |
| 5,553,662 A * | 9/1996 | Longardner | B60H 1/00492 165/10 |
| 5,561,986 A | 10/1996 | Goodall | |
| 5,870,897 A | 2/1999 | Barr et al. | |
| 6,059,016 A * | 5/2000 | Rafalovich | B60H 1/00492 165/10 |
| 6,062,030 A | 5/2000 | Viegas | |
| 6,327,871 B1 | 12/2001 | Rafalovich | |
| 6,378,319 B1 | 4/2002 | Mani | |
| 6,408,640 B1 | 6/2002 | Garrett et al. | |
| 6,543,245 B1 | 4/2003 | Waldschmidt et al. | |
| 6,609,382 B2 | 8/2003 | VanderWoude et al. | |
| 6,631,621 B2 | 10/2003 | VanderWoude et al. | |
| 6,688,120 B2 | 2/2004 | Aoki et al. | |
| 6,698,212 B2 | 3/2004 | Viegas et al. | |
| 6,751,966 B2 | 6/2004 | Viegas et al. | |
| 7,043,931 B2 * | 5/2006 | Plummer | B60H 1/323 62/236 |
| 7,089,756 B2 | 8/2006 | Hu | |
| 7,124,594 B2 | 10/2006 | McRell | |
| 7,162,878 B2 | 1/2007 | Narayanamurthy | |
| 7,174,736 B2 | 2/2007 | Chen et al. | |
| 7,363,772 B2 | 4/2008 | Narayanamurthy | |
| 7,421,846 B2 * | 9/2008 | Narayanamurthy | F24F 5/0017 62/333 |
| 7,503,185 B2 * | 3/2009 | Narayanamurthy | F24F 5/0017 62/332 |
| 7,690,212 B2 | 4/2010 | Narayanamurthy et al. | |
| 7,793,515 B2 | 9/2010 | Narayanamurthy | |
| 7,827,807 B2 | 11/2010 | Narayanamurthy et al. | |
| 7,854,129 B2 | 12/2010 | Narayanamurthy | |
| 7,891,211 B2 | 2/2011 | Aikawa | |
| 8,042,352 B2 | 10/2011 | DeAngelis | |
| 8,082,743 B2 | 12/2011 | Hermann et al. | |
| 2002/0129613 A1 | 9/2002 | Viegas et al. | |
| 2002/0162342 A1 | 11/2002 | Weng et al. | |
| 2002/0174666 A1 * | 11/2002 | Viegas | B60H 1/3205 62/131 |
| 2003/0019219 A1 | 1/2003 | Viegas et al. | |
| 2003/0019224 A1 * | 1/2003 | Vander Woude | F17C 7/04 62/186 |
| 2004/0216469 A1 | 11/2004 | Viegas et al. | |
| 2006/0137374 A1 * | 6/2006 | Chen | B60H 1/00014 62/239 |
| 2006/0196215 A1 | 9/2006 | Crumlin et al. | |
| 2007/0131782 A1 | 6/2007 | Ziehr et al. | |
| 2008/0011007 A1 * | 1/2008 | Larson | B60H 1/00428 62/323.2 |
| 2008/0087029 A1 | 4/2008 | Renken et al. | |
| 2009/0272132 A1 | 11/2009 | Rusignuolo et al. | |
| 2010/0180614 A1 | 7/2010 | Larson et al. | |
| 2011/0061410 A1 | 3/2011 | Narayanamurthy | |
| 2011/0162829 A1 * | 7/2011 | Xiang | C09K 5/063 165/234 |
| 2011/0254690 A1 | 10/2011 | Perten et al. | |
| 2012/0000212 A1 * | 1/2012 | Sanders | F25D 29/003 62/62 |
| 2012/0055180 A1 | 3/2012 | Larson et al. | |

FOREIGN PATENT DOCUMENTS

| | | |
|---|---|---|
| CN | 101021348 | 8/2007 |
| CN | 101457964 | 6/2009 |
| CN | 101508263 A | 8/2009 |
| CN | 201427542 Y | 3/2010 |
| CN | 201932065 | 8/2011 |
| CN | 201932065 U | 8/2011 |
| CN | 102958751 | 3/2013 |
| DE | 19907250 | 8/2000 |
| DE | 102006016557 | 10/2007 |
| DE | 102007015391 | 10/2008 |
| FR | 2284839 | 4/1976 |
| GB | 2383839 | 9/2003 |
| JP | 2004333112 | 11/2004 |
| NO | 2012176075 | 12/2012 |
| WO | 2006007663 | 1/2006 |

OTHER PUBLICATIONS

Written Opinion for International Application No. PCT/US2014/042975, dated Oct. 22, 2014 (7 pages).
International Search Report for International Application No. PCT/US2014/042975, dated Oct. 22, 2014 (3 pages).
International Search Report for International Application No. PCT/US2014/042895, dated Oct. 12, 2014 (3 pages).
Chinese Office Action issued in Chinese corresponding Application No. 201480045885.5 dated Oct. 17, 2016 (5 pages).
Chinese Office Action issued in Chinese Application No. 201480034710.4 dated Jan. 4, 2017 (8 pages).
Supplementary European Search Report issued in European Application No. 14813168.3 dated Mar. 2, 2017 (7 pages).
Supplementary European Search Report issued in European Application No. 14813298.8 dated Mar. 2, 2017 (6 pages).
Supplementary European Search Report issued in corresponding European Application No. 14814317.5 dated Mar. 3, 2017 (7 pages).

* cited by examiner

CONTROL METHOD FOR A HYBRID REFRIGERATION SYSTEM

FIELD

This disclosure generally relates to a hybrid refrigeration system for controlling refrigeration to cool an air inside a cargo space and methods for using and configuring the device.

BACKGROUND

Existing transport refrigeration systems are used to cool containers, such as for example, a refrigerated transport unit ("TU"), a trailer, a railcar, or other TU(s). The TUs are commonly used to transport perishable items such as produce and meat products. In such a case, a transport refrigeration system ("TRS") can be used to condition the air inside a cargo space of the TU, thereby maintaining desired temperature and humidity during transportation or storage. Typically a transport refrigeration unit ("TRU") is attached to the TU to facilitate a heat exchange between the air inside the cargo space and the air outside of the TU.

SUMMARY

The embodiments described herein relate generally to a TRS. In particular, the embodiments described herein generally relate to a hybrid refrigeration system for controlling refrigeration to cool an air inside a cargo space and methods for using and configuring the device.

In particular, the embodiments described herein are directed to a hybrid refrigeration system and method for cooling an air inside a cargo space using an eutectic device connected to at least two independent cooling fluid circuits. The eutectic device can be installed inside the cargo space of a refrigerated transport unit.

The TRS can be connected to and/or include a controller (e.g., TRS controller) for operating the TRS. The TRS includes an eutectic device including an eutectic medium, a TRU having a refrigerant circuit for directing a refrigerant fluid through the TRU and capable of directing the refrigerant fluid to the eutectic device for cooling the eutectic medium, and a cooling fluid circuit in thermal contact with the eutectic medium, the cooling fluid circuit configured to direct a cooling fluid to be in thermal contact with the eutectic medium.

An embodiment of a method for controlling the TRS includes selecting, via the TRS controller (which the TRS controller receives the selection of), a cooling mode for the TRS, and cooling an inside of a transport unit according to the cooling mode selected, wherein the cooling includes one or more of directing the refrigerant fluid through the TRU according to the cooling mode selected, directing the refrigerant fluid to the eutectic device according to the cooling mode selected, and directing a cooling fluid through the cooling fluid circuit to cool the eutectic device according to the cooling mode selected.

An embodiment of the method includes a plurality of cooling modes for the TRS that are selectable (e.g., the TRS controller receives the selection of). The cooling modes include a manual cooling mode, wherein a cooling type of the TRS is based on a selection made by a user via the TRS controller; an automatic cooling mode, wherein the cooling type of the TRS is automatically set by the TRS controller; a dynamic cooling mode, wherein the cooling type of the TRS is based on dynamic information received by the TRS controller; and a preset cooling mode, wherein the cooling type of the TRS is based on a predetermined information stored at the TRS controller. The cooling type information of the TRS can be communicated between the TRS controller as telematics data via a Global Positioning System (GPS), etc.

An embodiment of the method includes one or more of selecting (which the TRS controller receives the selection of) the manual cooling mode to select the cooling type; selecting (which the TRS controller receives the selection of) the automatic cooling mode to have the TRS controller automatically set the cooling type; selecting (which the TRS controller receives the selection of) the dynamic cooling mode to have the TRS controller set the cooling type based on the dynamic information; and selecting (which the TRS controller receives the selection of) the preset cooling mode to have the TRS controller set the cooling type based on the predetermined information.

In an embodiment of the method, the manual cooling mode is selected, and the cooling the inside of the transport unit comprises cooling via a first cooling type which directs a refrigerant fluid through a first cooling fluid circuit of the TRS, and cooling via a second cooling type which directs a cooling fluid through a second cooling fluid circuit of the TRS.

In some embodiments, the first cooling fluid circuit allows refrigerant fluid to pass through a refrigeration circuit in a TRU of the TRS and/or through an eutectic device of the TRS. Also, in some embodiments, the second cooling fluid circuit allows a cooling fluid (e.g., liquid cryogen) to pass through the eutectic device of the TRS.

In some embodiments, the TRS includes seven cooling types including: a first cooling type that directs a refrigerant fluid through a refrigeration circuit in a TRU and an eutectic device of the TRS and directs a cooling fluid through the eutectic device; a second cooling type that directs the refrigerant fluid through the refrigeration circuit but not through the eutectic device and directs the cooling fluid through the eutectic device; a third cooling type that directs the refrigerant fluid through the eutectic device but not the refrigeration circuit and directs the cooling fluid through the eutectic device; a fourth cooling type that directs the refrigerant fluid through the refrigeration circuit and the eutectic device but does not direct the cooling fluid through the eutectic device; a fifth cooling type that directs the refrigerant fluid through the refrigeration circuit but does not direct the refrigerant fluid or the cooling fluid through the eutectic device; a sixth cooling type that directs the refrigerant fluid through the eutectic device but does not direct the refrigerant fluid through the refrigeration circuit and does not direct the cooling fluid through the eutectic device; a seventh cooling type that directs the cooling fluid through the eutectic device but does not direct the refrigerant fluid through either the refrigeration circuit or the eutectic device.

In another embodiment of the method, the automatic cooling mode is selected, and the cooling the inside of the transport unit comprises, checking a status of the TRS, automatically selecting one of a first through seventh cooling type based on the status of the TRS, and cooling an interior space of a TU according to the cooling type selected.

In another embodiment of the method, the dynamic cooling mode is selected, and the cooling the inside of the transport unit comprises, a TRS controller connecting to a network, the TRS controller receiving data via the network, the TRS controller processing the data and transforming the data to TRS control information, the TRS controller selecting one of a first through seventh cooling type based on the TRS control information, and cooling according to the TRS control information and the first through seventh cooling type selected.

In an embodiment of the method, the TRS controller determining the cooling type includes the TRS controller determining whether a first cooling type, which directs a refrigerant fluid through a refrigeration circuit and/or an eutectic device of the TRS, is allowable based on the TRS control information, and cooling includes cooling via the first cooling type if the first cooling type is determined to be allowable based on the TRS control information, or cooling via a second cooling type which directs a cooling fluid through an eutectic device of the TRS if the first cooling type is determined to be not allowable based on the TRS control information.

In an embodiment of the method, the TRS controller determining the cooling type includes the TRS controller determining to direct a cooling fluid through an eutectic device of the TRS, and the cooling includes directing the cooling fluid through the eutectic device of the TRS.

In an embodiment of the method, the TRS controller determining the cooling type includes the TRS controller determining to direct a refrigerant fluid through a first fluid circuit of the TRS, and to direct a cooling fluid through a second fluid circuit to cool an eutectic device of the TRS, and the cooling includes directing the refrigerant fluid through the first fluid circuit of the TRS, and directing the cooling fluid through the second fluid circuit to cool the eutectic device of the TRS.

In an embodiment of the method, the TRS controller determining the cooling type includes the TRS controller determining that cooling the TRS is not needed.

In an embodiment of the method, the cooling includes the TRS controller not directing a refrigerant fluid through a first fluid circuit of the TRS, and not directing a cooling fluid through a second fluid circuit to cool an eutectic device of the TRS.

In another embodiment of the method, the preset cooling mode is selected, and the cooling the inside of the transport unit comprises the TRS controller accessing a memory to read data stored therein, the TRS controller processing the data, the TRS controller selecting a cooling type by running a predictive algorithm, and cooling via the cooling type selected.

In an embodiment of the method, the TRS controller selecting the cooling type includes the TRS controller selecting to direct a refrigerant fluid through the TRS, and the cooling includes directing the refrigerant fluid through the TRS.

In an embodiment of the method, the TRS controller selecting the cooling type includes the TRS controller selecting to direct a cooling fluid through a cooling fluid circuit that is in thermal contact with an eutectic device of the TRS, and the cooling includes directing the cooling fluid through the cooling fluid circuit.

In another embodiment of the method, the TRS controller selecting the cooling type includes the TRS controller selecting to direct a refrigerant fluid through a first fluid circuit of the TRS, and to direct a cooling fluid through a second fluid circuit to cool an eutectic device of the TRS, and the cooling includes directing the refrigerant fluid through the first fluid circuit of the TRS, and directing the cooling fluid through the second fluid circuit to cool the eutectic device of the TRS.

In another embodiment of the method, the TRS controller selecting the cooling type includes the TRS controller selecting that cooling the TRS is not needed.

In another embodiment of the method, the cooling includes the TRS controller not directing a refrigerant fluid through a first fluid circuit of the TRS, and not directing a cooling fluid through a second fluid circuit to cool an eutectic device of the TRS.

An embodiment of a TRS controller for controlling a TRS, wherein the TRS includes an eutectic device including an eutectic medium, a TRU having a refrigerant circuit for directing a refrigerant fluid through the TRU and capable of directing the refrigerant fluid to the eutectic device for cooling the eutectic medium, and a cooling fluid circuit in thermal contact with the eutectic medium, the cooling fluid circuit configured to direct a cooling fluid to be in thermal contact with the eutectic medium, comprises a network interface for connecting to a network; a processor connected to the network interface for receiving data from the network; a user interface connected to the processor; and a non-transitory computer-readable memory connected to the processor, the non-transitory computer-readable memory having computer-readable instructions that when executed by the processor performs a method for controlling the TRS, wherein the method includes selecting (which the TRS controller receives the selection of) a cooling mode for the TRS, and cooling an inside of a transport unit according to the cooling mode selected, wherein the cooling includes one or more of directing the refrigerant fluid through the TRU according to the cooling mode selected, directing the refrigerant fluid to the eutectic device according to the cooling mode selected, and directing a cooling fluid through the cooling fluid circuit to cool the eutectic device according to the cooling mode selected.

An embodiment of a non-transitory computer-readable medium having computer-readable instructions that when executed by a processor performs a method for controlling a TRS, wherein the method includes selecting (which the TRS controller receives the selection of) a cooling mode for the TRS, and cooling an inside of a transport unit according to the cooling mode selected, wherein the cooling includes one or more of directing the refrigerant fluid through the TRU according to the cooling mode selected, directing the refrigerant fluid to the eutectic device according to the cooling mode selected, and directing a cooling fluid through the cooling fluid circuit to cool the eutectic device according to the cooling mode selected.

BRIEF DESCRIPTION OF THE DRAWINGS

Referring now to the drawings in which like reference numbers represent corresponding parts throughout.

DETAILED DESCRIPTION

The embodiments described herein are directed to a TRS. More particularly, the embodiments relate to a hybrid refrigeration system for controlling refrigeration to cool an air inside a cargo space and methods for using and configuring the device.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of a conditioned space of the refrigerated transport unit.

It will be appreciated that the embodiments described herein may be used in any suitable transport unit such as a ship board container, an air cargo cabin, an over the road truck cabin, etc.

Figure 1:
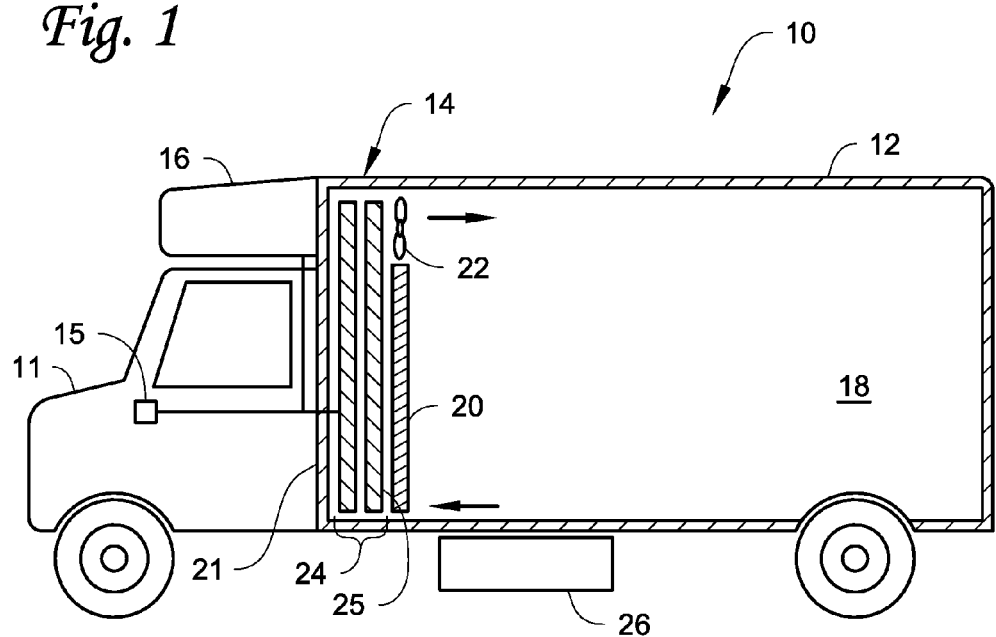
FIG. 1 illustrates a side cutaway view of a refrigerated transport unit attached to a tractor, according to an embodiment.

FIG. 1 illustrates a side view of a refrigerated transport unit 10 attached to a tractor 11. The refrigerated transport unit 10 includes a transport unit 12 and a TRS 14. The TRS 14 includes a transportation refrigeration unit ("TRU") 16 that is configured to create a conditioned air flow from a front side to a rear side of the cargo space 18. The TRU 16 includes a TRS controller 15 that is configured to control the TRS 14.

FIG. 1 illustrates a side view of a refrigerated transport unit 10 attached to a tractor 11. The refrigerated transport unit 10 includes a transport unit 12 and a TRS 14. The TRS 14 can include one or more of a Mechanical Refrigeration System, an Eutectic System, and a Cryogen System. A TRS controller 15 that is configured to control the TRS 14 is in communication with and/or controls the one or more of the Mechanical Refrigeration System, the Eutectic System, and the Cryogen System.

Figure 11:
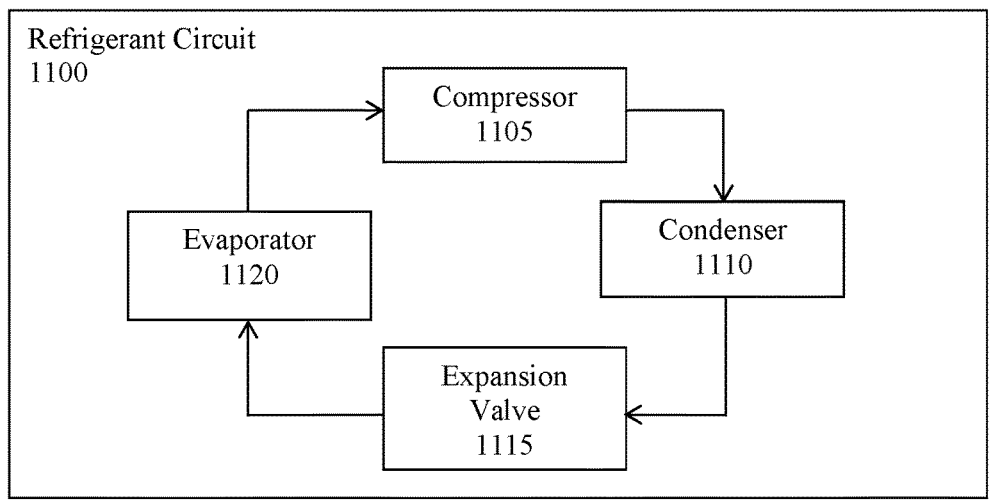
FIG. 11 shows a block diagram according to an embodiment of a refrigerant circuit.

The Mechanical Refrigeration System of the TRS 14 includes a transportation refrigeration unit ("TRU") 16 that is configured to create a conditioned air flow from a front side to a rear side of the cargo space 18. The TRU 16 is in communication with the TRS controller 15. The TRU 16 houses various refrigeration components, such as a compressor, an evaporator blower, condenser blowers, an evaporator coil, condenser coils, etc., and provide a thermal barrier between the front side (e.g. the side where the condenser unit is located) and the rear side (e.g. the side where an evaporator unit is located). The TRU 16 includes a refrigerant fluid flowing through a refrigerant circuit (e.g., the compressor 1105, the condenser 1110, the expansion valve 1115, and the evaporator unit 1120 of the refrigerant circuit 1100 shown in FIG. 11). The compressor of the refrigeration circuit can be powered by a vehicle's engine or another mechanical device.

The Eutectic System of the TRS 14 includes an eutectic device 24 having an eutectic medium. The eutectic medium can be cooled via a refrigerant fluid flowing through a refrigerant circuit (e.g., the Mechanical Refrigeration System or the TRU 16). The eutectic medium can be cooled via a cooling fluid circuit of the Cryogen System. Once the Eutectic System has been cooled (e.g., the eutectic medium has been frozen), the Eutectic System can cool the cargo space 18. The cooling of the cargo space 18 by using the Eutectic System can be performed without using the Mechanical Refrigeration System and/or the Cryogen System.

The Cryogen System of the TRS 14 includes a cooling fluid circuit for directing a cooling fluid to pass through the eutectic device. The Cryogen System can be used to cool the Eutectic System. The Cryogen System can be used to cool the cargo space 18. The cooling of the cargo space 18 by using the Cryogen System can be performed without using the Mechanical Refrigeration System and/or the Eutectic System.

A method of using the TRS 14 includes using both the Mechanical Refrigeration System and the Cryogen System of the TRS 14. For example, at startup of the Mechanical Refrigeration System, a user can manually select whether the Cryogen System is to be operated or not. For example, at startup of the Mechanical Refrigeration System, the Cryogen System can turn on automatically, allowing the TRS 14 to lower the temperature of the cargo space 18 faster than when only the Mechanical Refrigeration System is functioning. The Cryogen System could then turn off based on settings determined by the user and/or the TRS controller 15. Some examples of the settings can include, but are not limited to, a difference of a setpoint temperature vs. ambient temperature, a difference of a setpoint temperature vs. return air temperature, an operation mode of the Mechanical Refrigeration System (e.g., high speed, low speed, and defrost). These settings can be regulated based on information received by the TRS controller 15 via a GPS. For example, based on a user defined geo-fencing locations or times, the TRS 14 can be set to a particular mode. Further, the TRS controller 15 can have operational settings based on a pre-programmed vehicle route having intermediate stops to a final destination. The route could be uploaded to the TRS controller 15 from the GPS. The TRS controller 15 can execute computer readable instructions for a predictive operating algorithm and determine whether the Mechanical Refrigeration System and/or the Cryogen System should be used. The predictive operating algorithm of the computer readable instructions can take into account one or more of the following parameters for making the determination: a difference of setpoint temperature vs. ambient temperature, a difference of setpoint temperature vs. return air temperature, a distance to the next stop, traffic condition, speed of the vehicle, and other route information. The predictive algorithm can ensure that the cargo space 18 reaches the setpoint temperature before reaching the next destination. Further, for a TRS having the Mechanical Refrigeration System powered by the vehicle's engine, the predictive algorithm can ensure that the cargo space 18 reaches the setpoint temperature before the vehicle engine is shut off (e.g., due to stopping in traffic). The predictive algorithm can be used to define geofences and times to switch to Cryogen System only mode based on noise and emissions restrictions set by the geofences and times.

A method of using the TRS 14 includes using both the Mechanical Refrigeration System and the Eutectic System of the TRS 14. For example, at startup of the Mechanical Refrigeration System, a user can manually select whether the Eutectic System is to be operated or not. For example, at startup of the Mechanical Refrigeration System, the Eutectic System can turn on automatically, allowing the TRS 14 to lower the temperature of the cargo space 18 faster than when only the Mechanical Refrigeration System is functioning. The Eutectic System could then turn off based on settings determined by the user and/or the TRS controller 15. Some examples of the settings can include, but are not limited to, a difference of a setpoint temperature vs. ambient temperature, a difference of a setpoint temperature vs. return air temperature, an operation mode of the Mechanical Refrigeration System (e.g., high speed, low speed, and defrost). These settings can be regulated based on information received by the TRS controller 15 via a GPS. For example, based on a user defined geo-fencing locations or times, the TRS 14 can be set to a particular mode. Further, the TRS controller 15 can have operational settings based on a pre-programmed vehicle route having intermediate stops to a final destination. The route could be uploaded to the TRS controller 15 from the GPS. The TRS controller 15 can execute computer readable instructions for a predictive operating algorithm and determine whether the Mechanical Refrigeration System and/or the Eutectic System should be used. The predictive operating algorithm of the computer readable instructions can take into account one or more of the following parameters for making the determination: a difference of setpoint temperature vs. ambient temperature, a difference of setpoint temperature vs. return air temperature, a distance to the next stop, traffic condition, speed of the vehicle, and other route information. The predictive algorithm can ensure that the cargo space 18 reaches the setpoint temperature before reaching the next destination. Further, for a TRS having the Mechanical Refrigeration System powered by the vehicle's engine, the predictive algorithm can ensure that the cargo space 18 reaches the setpoint temperature before the vehicle engine is shut off (e.g., due to stopping in traffic). The predictive algorithm can be used to define geofences and times to switch to Eutectic System only mode based on noise and emissions restrictions set by the geofences and times. Further, the vehicle can include an onboard eutectic condenser (or a coolant tank such as a $CO_2$ tank) to freeze the eutectic medium.

A method of using the TRS 14 includes using all of the Mechanical Refrigeration System, the Cryogen System, and the Eutectic System of the TRS 14. The operation of the Mechanical Refrigeration System, the Cryogen System, and the Eutectic System being determined by the user and/or the TRS controller 15.

A blower fan 22 of the TRS 14 can provide additional air flow for the cooling of the cargo space 18. The eutectic device 24 can be cooled by the TRU 16. This cooling of the eutectic device 24 can be by direct cooling by thermal contact between the evaporator coil of the TRU 16 and the eutectic device 24, a cooling refrigerant circuit from the TRU 16 to the eutectic device 24, and/or by indirect cooling by cooled air from the TRU 16 cooling the eutectic device 24 as the cooled air flows from the TRU 16 over the eutectic device 24 towards the a desired side of the cargo space 18. For example but not limited to, the desired side of the cargo space 18 may be the rear side of the cargo space 18. For example but not limited to, the desired side of the cargo space 18 may be the front side of the cargo space 18. For example but not limited to, the desired side of the cargo space 18 may be any one or combination of portions (areas) of the cargo space 18. For example, the eutectic device 24 (or the plates of the eutectic device 24) can be connected to a ceiling of the cargo space 18. For example, in such configuration, a blower fan may not be needed because air cooled by the eutectic device 24 would naturally flow downward from the ceiling of the cargo space 18.

The TRS 14 is also configured to transfer heat between the cargo space 18 and the eutectic device 24. The eutectic device 24 is configured for controlling the temperature in the cargo space 18. FIG. 1 shows the eutectic device 24 positioned near the front wall 21 of the transport unit 12, in front of the bulkhead 20 (e.g., between the front wall 21 and the bulkhead 20 in the container). The blower fan 22 can blow air cooled by the eutectic device 24 towards the desired side of the cargo space 18.

The eutectic device 24 includes cold plates 25. However, the eutectic device 24 can include one or more cold plates 25, tubes, or combinations thereof. The eutectic device 24 contains an eutectic medium. The eutectic medium can become solid when cooled (e.g., freezes) and then absorbs heat to transition to a liquid. The eutectic medium can include, for example, sodium chloride solution, calcium chloride solution, etc.

FIG. 1 shows a cooling fluid tank 26 that is connected to the Cryogen System and/or the Eutectic System of the TRS 14. The cooling fluid tank 26 can be connected to the eutectic device 24 to direct the cooling fluid, such as a cryogen, from the cooling fluid tank 26 to the eutectic device 24. Optionally, the cooling fluid tank 26 can be connected to the refrigerated transport unit 10 and/or the tractor 11, so that the cooling fluid tank 26 can provide the cooling fluid to the eutectic device 24 for cooling the eutectic medium as desired or needed, while in transit. In one embodiment, the cooling fluid tank 26 is connected to the refrigerated transport unit 10, so that the cooling fluid tank 26 is mobile with the refrigerated transport unit 10. In another embodiment, the cooling fluid tank 26 is not connected to the refrigerated transport unit 10, so that the cooling fluid tank 26 is not mobile with the refrigerated transport unit 10.

After the eutectic medium has been frozen, the TRS 14 can cool the cargo space 18 without generating any substantial noise, or any noise. Thus, advantageously, the eutectic device 24 can provide near silent cooling to the cargo space 18. Additionally, the TRS 14 having the eutectic device 24 can cool the cargo space 18 when the TRU 16 is turned off, so that the cooling of the cargo space 18 can be provided with no power, or very little power (e.g. low amount of power for running the blower fan 22). Further, the TRS 14 with the eutectic device 24 can cool the cargo space 18 faster than a conventional refrigeration system that has only a conventional TRU.

Figure 2:
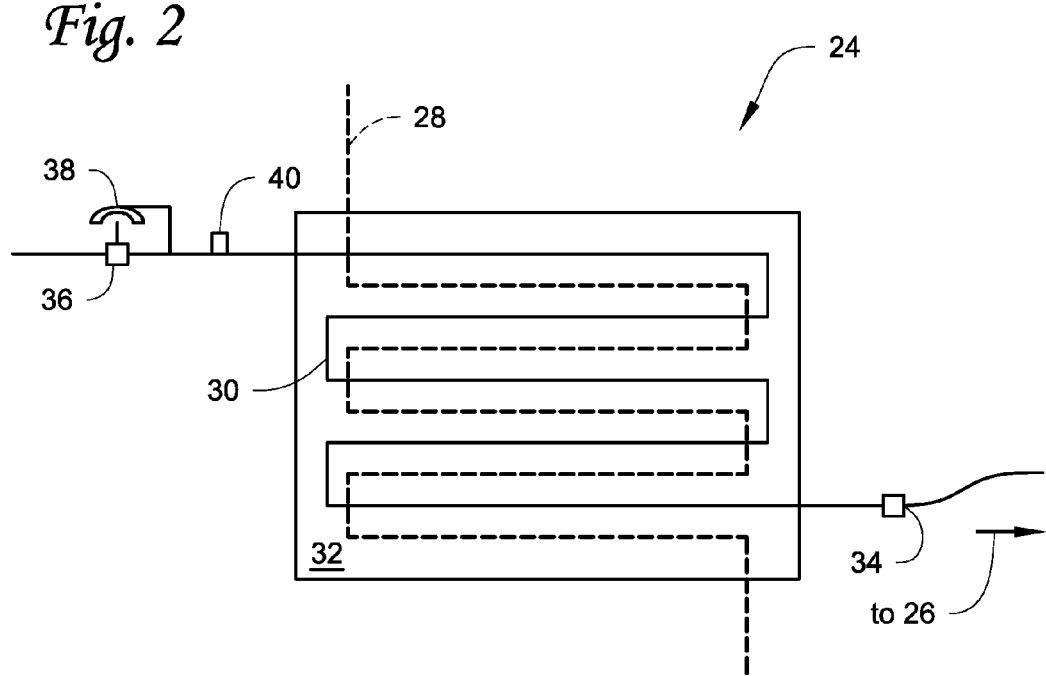
FIG. 2 illustrates an eutectic device for a TRS according to one embodiment.

FIG. 2 shows an embodiment of the eutectic device 24. The eutectic device 24 includes a refrigerant circuit 28 and a cooling fluid circuit 30. The operation of one or preferably both the refrigerant circuit 28 and the cooling fluid circuit can be controlled by a TRS controller (not shown in FIG. 2, but shown in FIGS. 1 and 3).

The eutectic device 24 contains the eutectic medium 32 therein. The eutectic medium 32 becomes solid when cooled (e.g., freezes) and then absorbs heat to transition to the liquid phase.

The refrigerant circuit 28 of the eutectic device 24 can be, for example, a part of the refrigerant circuit connected to the TRU, for example, an evaporator coil that direct the refrigerant fluid from the TRU to the TRU's condenser unit. Alternatively, the refrigerant circuit 28 can be a cooling line separate from the evaporator coil running from the TRU for cooling the eutectic device 24 with the TRU. The refrigerant fluid running through the refrigerant circuit 28 absorbs heat from the eutectic device 24 (e.g., from the plates or tubes and/or from the eutectic medium 32) to cool and/or maintain the temperature of the eutectic device 24.

The eutectic device 24 includes the cooling fluid circuit 30 for directing a cooling fluid therethrough. The cooling fluid circuit 30 has a cooling fluid inlet 34 and a gas outlet 36. For example, the cooling fluid inlet 34 has a connector for connecting to the cooling fluid tank (e.g. the cooling fluid tank 26 shown in FIG. 1).

The cooling fluid circuit 30 directs the cooling fluid to flow therethrough without physically mixing with the eutectic medium 32. The cooling fluid circuit 30 allows the cooling fluid to have thermal contact with the eutectic medium 32, so that heat can transfer from the eutectic medium 32 to the cooling fluid flowing through the cooling fluid circuit 30. When heat is transferred from the eutectic medium 32 to the cooling fluid, the eutectic medium 32 becomes frozen and the cooling fluid transitions from a liquid phase to a gas phase.

Thus, when the cooling fluid is introduced into the cooling fluid circuit 30 via the cooling fluid inlet 34, the cooling fluid is in a liquid phase. When the cooling fluid leaves the cooling fluid circuit 30 via the gas outlet 36, the cooling fluid is in a gas phase. The gas outlet 36 is disposed outside the container, so that the cooling fluid gas does not enter the cargo space (20 shown in FIG. 1).

Figure 12:
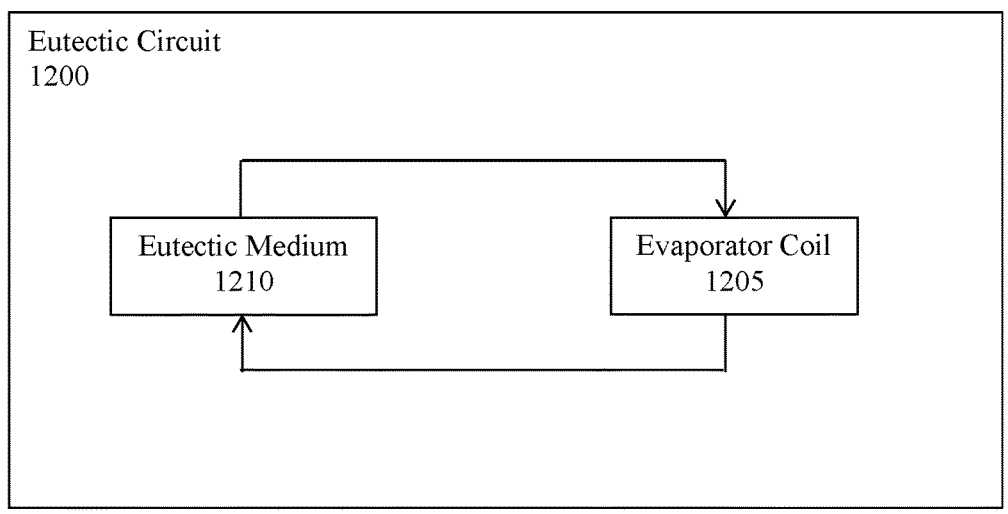
FIG. 12 shows a flow diagram according to an embodiment of a cooling circuit.

In an embodiment, the cooling fluid circuit 30 includes an evaporator coil, wherein transitioning the liquid phase of the cooling fluid to the gas phase of the cooling fluid occurs at the evaporator coil (see FIG. 12 showing a cooling circuit 1200 with an evaporator coil 1205 and a eutectic medium 1210).

In an embodiment, the eutectic device 24 uses a cryogen as the cooling fluid to freeze the eutectic medium 32. Examples of the cryogen are, but are not limited to, carbon dioxide ($CO_2$) and nitrogen ($N_2$). Thus, when the cryogen is introduced into the cooling fluid circuit 30 via the cooling fluid inlet 34, the cryogen is in a liquid phase, such as liquid carbon dioxide or liquid nitrogen. When the cryogen leaves the cooling fluid circuit 30 via the gas outlet 36, the cryogen is in a gas phase, such as carbon dioxide gas or nitrogen gas.

The frozen eutectic medium 32 then transfers heat to a plate or a tube of the eutectic device, which cools the air inside the cargo space of the container.

The cooling fluid circuit 30 can also include a back pressure regulator 38 at the gas outlet 36 that prevents back pressure issues. For example, when the cryogen is $CO_2$, the back pressure regulator 38 prevents pressure from dropping too low, which would cause dry ice (solid phase of $CO_2$) formation. Dry ice can block the flow of the cryogen and stop the cooling process. This dry ice formation issue does not exist when the cryogen is $N_2$, so back pressure regulator 38 is not needed for embodiments that use $N_2$ as the cryogen. Additionally, the cooling fluid circuit 30 can also include a sensor 40 that can detect a condition of the cooling fluid circuit 30, wherein the condition can be, but not limited to, temperature.

In an embodiment, the cooling fluid circuit 30 can operate without a compressor unit and/or a condensing unit. The term condensing unit is used herein to describe a separate and independent device from a condenser of the Mechanical Refrigeration System. That is, the Mechanical Refrigeration System includes the condenser. The condensing unit is a separate and independent device from the Mechanical Refrigeration System. Accordingly, the cooling fluid circuit 30 which can operate without the condensing unit does not preclude the eutectic device 24 being operable with the Mechanical Refrigeration System (which includes the condenser). In an embodiment, the cooling fluid circuit 30 does not include a blower.

Figure 3:
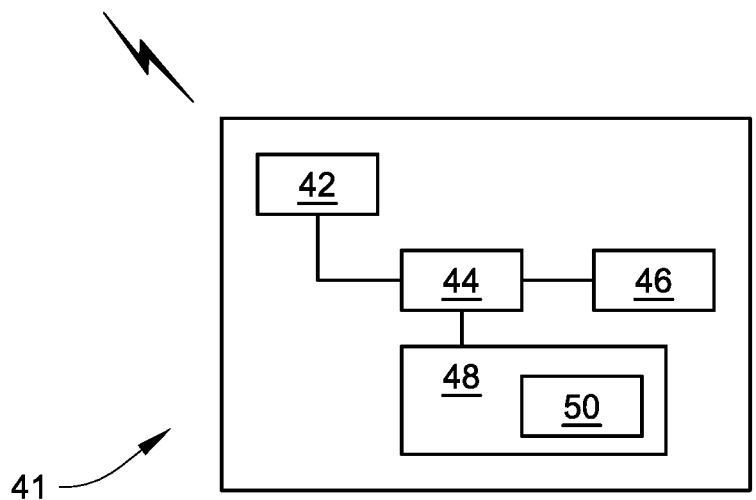
FIG. 3 shows a schematic diagram of an embodiment of a TRS controller for controlling the TRS.

FIG. 3 shows an embodiment of a TRS controller 41 for controlling a TRS. The TRS controller 41 includes a network interface 42 for connecting to a network, a processor 44 connected to the network interface 42 for receiving and/or sending data from the network. The TRS controller 41 also includes a user interface unit 46 connected to the processor 44. The user interface unit 46 can display information and receive user input and transmit the user input to the processor for operating the TRS. The TRS controller 41 includes a non-transitory computer-readable memory 48 connected to the processor 44. The non-transitory computer-readable memory 48 has stored therein computer-readable instructions 50 that when executed by the processor 44, the TRS controller 41 can perform a method for controlling the TRS, as described more in detail below and shown in FIGS. 4-10.

Figure 4:
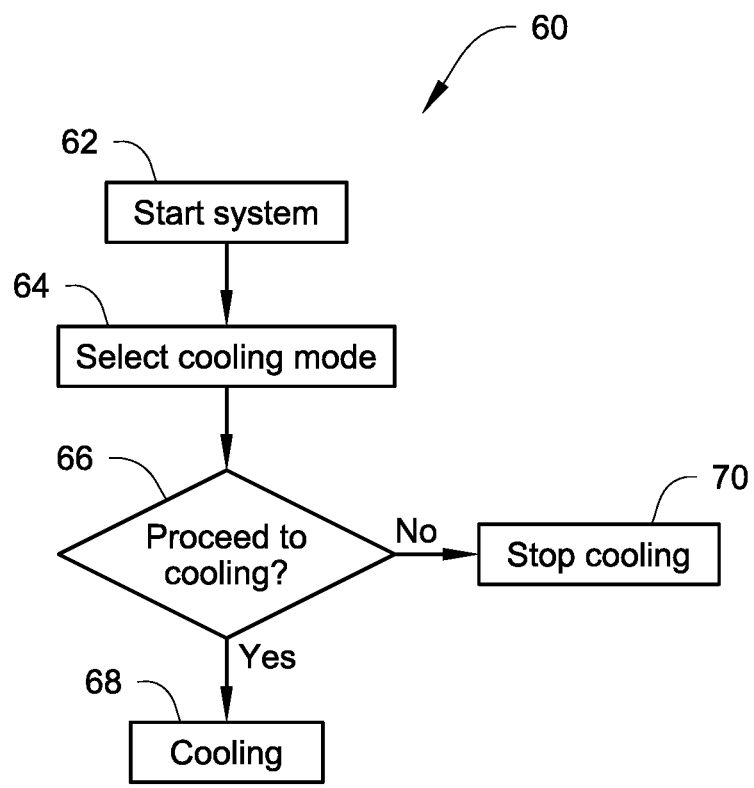
FIG. 4 shows a flow diagram according to an embodiment of a method for controlling a hybrid cooling system.

FIG. 4 shows a flow diagram of an embodiment of a method 60 for operating and/or controlling a TRS. The method 60 begins with starting 62 the TRS. Once the TRS has been started, a cooling mode of the TRS is selected 64, for example, by a user interacting with a user interface of the TRS controller of the TRS. The selection 64 of the cooling mode can be performed by the TRS controller. At 64, "selecting" the cooling mode includes detecting the cooling mode (e.g., the TRS controller receiving the selection), if the cooling mode has been preset, e.g., set prior to the starting 62 of the TRS. Accordingly, the preset cooling mode being detected by the TRS controller is included in the "selecting" at 64. Once the cooling mode has been selected 64, the processor of the TRS controller selects to determine 66 whether to proceed to cooling or not. If the processor selects to proceed to cooling, then cooling 68 of the TRS is initiated by the TRS controller operating the TRS to cool the transport unit (e.g., the inside of the transport unit). If the processor selects not to proceed to cooling, then the TRS controller operating the TRS does not cool the transport unit and/or stops the cooling 70 if the TRS is currently cooling the transport unit.

Figure 5:
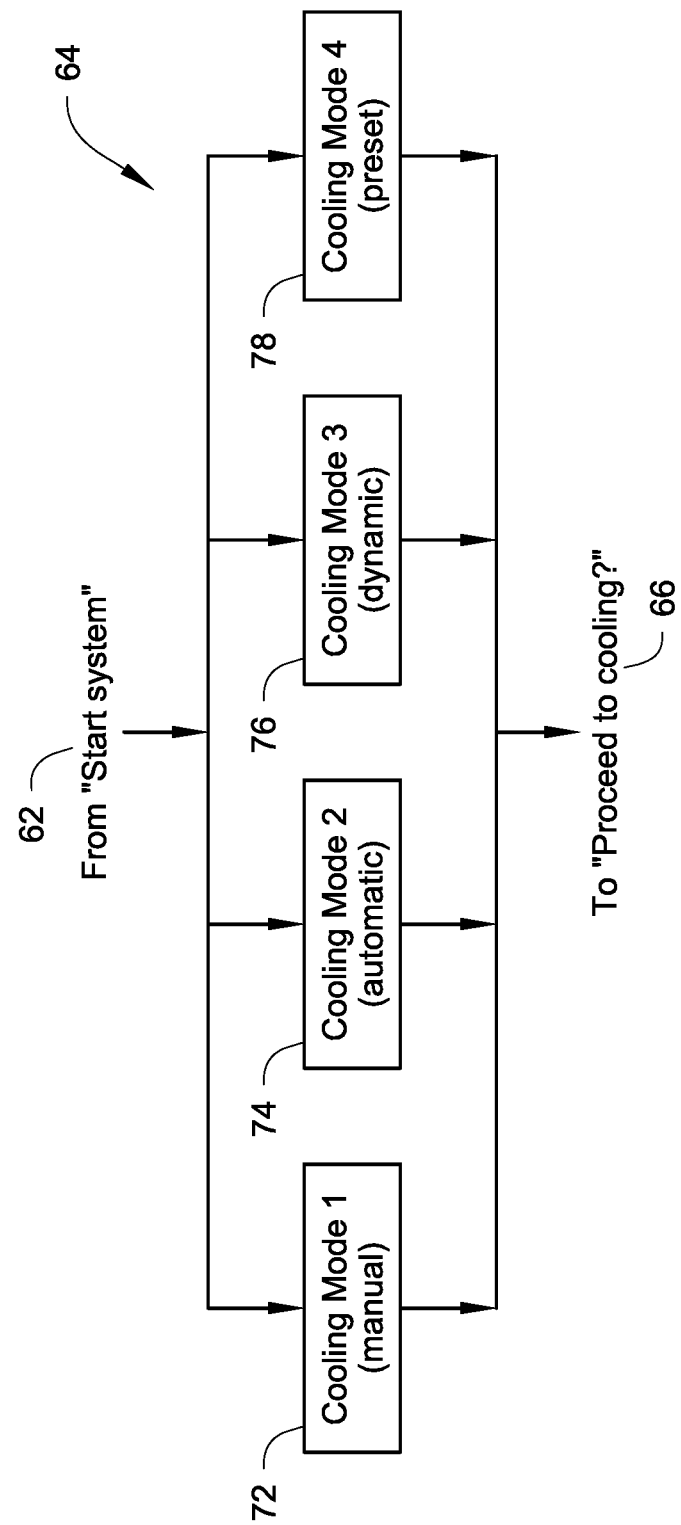
FIG. 5 shows a flow diagram according to an embodiment of a part of the method for controlling a hybrid cooling system.

FIG. 5 shows a flow diagram of an embodiment of the selection at 64 from FIG. 4. Following from the starting 62 the TRS, the selection 64 of the cooling mode is selected from a plurality of cooling modes for the TRS. The cooling modes include a manual cooling mode 72, a local automatic cooling mode 74 (hereinafter referred to as an automatic cooling mode 74), a dynamic cooling mode 76, and a preset cooling mode 78. After one of the cooling modes are selected, the method proceeds to the determining at 66 whether cooling is to be performed or not (see FIG. 4). Any one of the modes may be a default mode for the TRS. A user (e.g., operator) can perform the selection 64 of the cooling mode.

Figure 6:
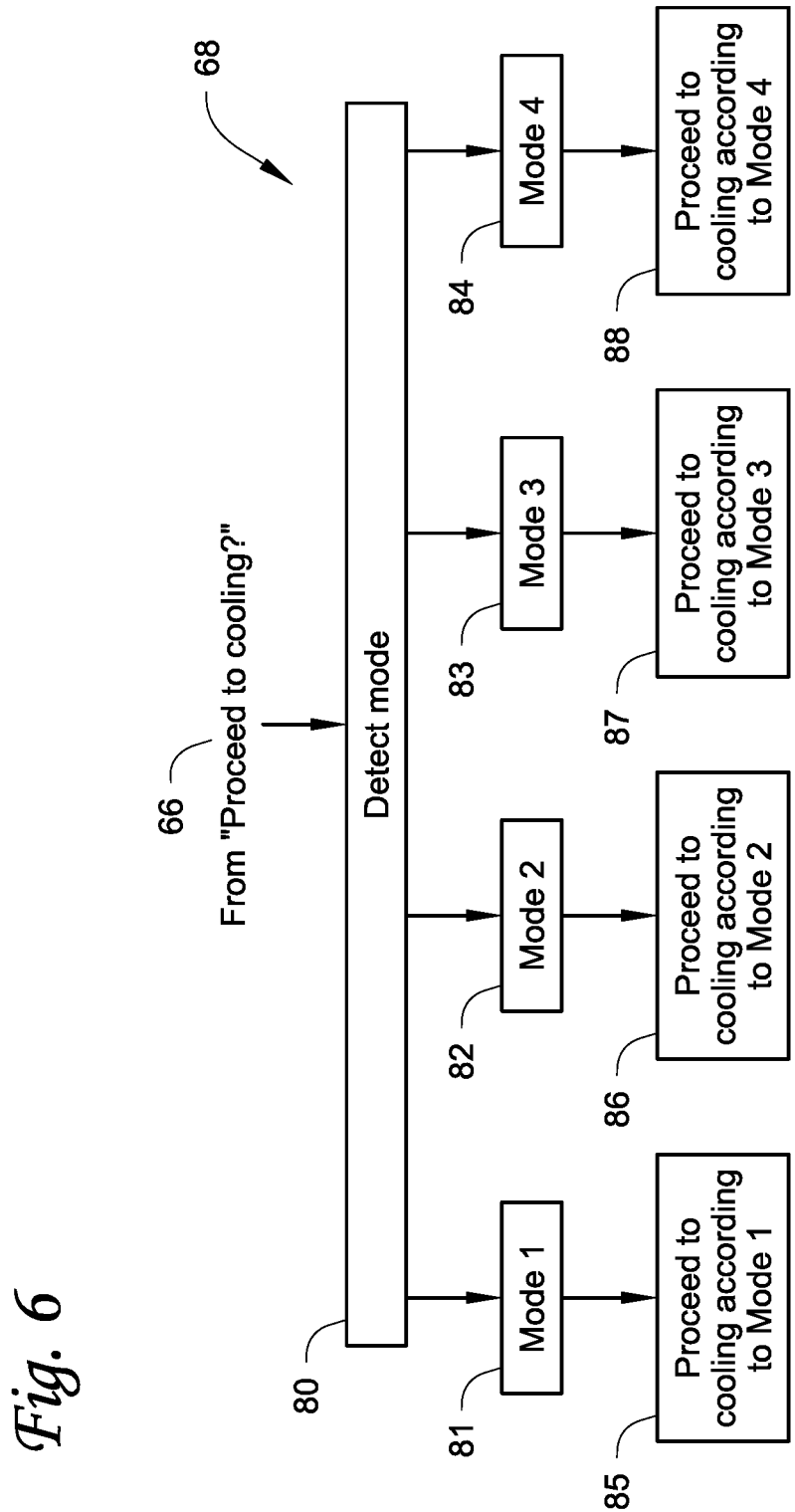
FIG. 6 shows a flow diagram according to an embodiment of a part of the method for controlling a hybrid cooling system.

If the processor selects to proceed to cooling, then cooling 68 of the TRS is initiated by the TRS controller operating the TRS to cool the transport unit (e.g., the inside of the transport unit). FIG. 6 shows a flow diagram of an embodiment of the cooling at 68. The cooling at 68 includes detecting 80 the selected cooling mode from the selection at 64. Based on the cooling mode detected at the detecting at 80, the TRS controller proceeds to one of the cooling modes. For example, FIG. 6 shows four cooling modes, modes 1-4, which are a manual cooling mode 81, an automatic cooling mode 82, a dynamic cooling mode 83, and a preset cooling mode 84.

If mode 1, e.g., the manual cooling mode 81 is detected from the detecting at 80, then the cooling at 68 proceeds to 85 to cooling according to mode 1. An example of cooling according to mode 1 is described in regards to FIG. 7.

If mode 2, e.g., the automatic cooling mode 82 is detected from the detecting at 80, then the cooling at 68 proceeds at 86 to cooling according to mode 2. An example of cooling according to mode 2 is described in regards to FIG. 8.

If mode 3, e.g., the dynamic cooling mode 83 is detected from the detecting at 80, then the cooling at 68 proceeds 87 to cooling according to mode 3. An example of cooling according to mode 3 is described in regards to FIG. 9.

If mode 4, e.g., the preset cooling mode 84 is detected from the detecting at 80, then the cooling at 68 proceeds 88 to cooling according to mode 4. An example of cooling according to mode 4 is described in regards to FIG. 10.

Figure 7:
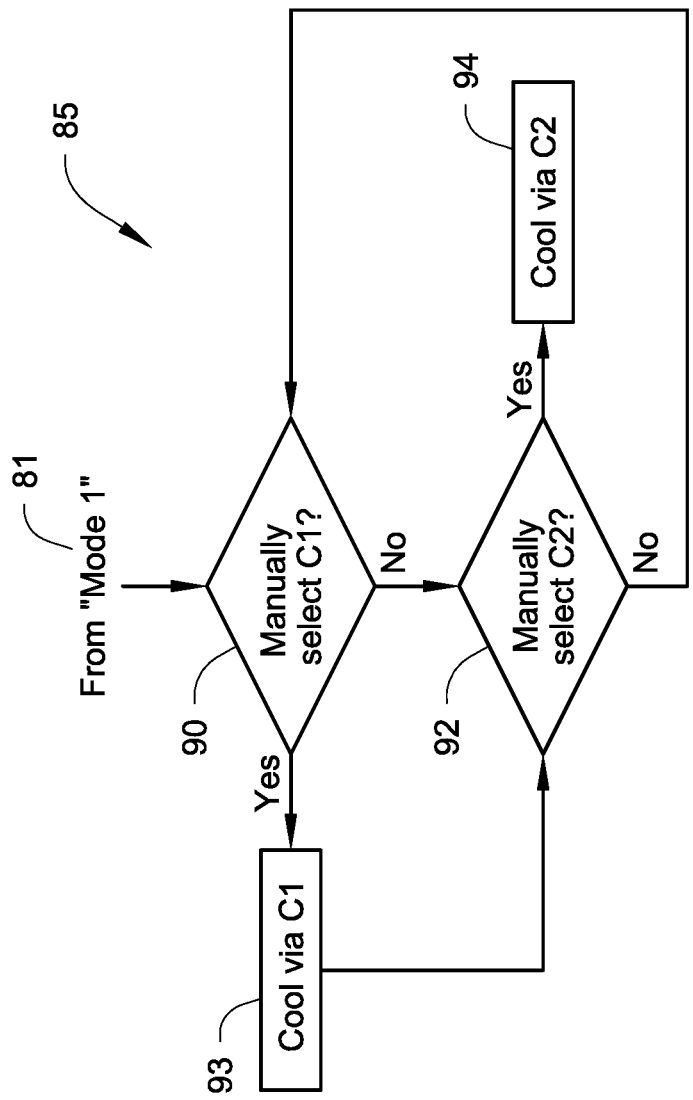
FIG. 7 shows a flow diagram according to an embodiment of a part of the method for controlling a hybrid cooling system.

FIG. 7 shows a flow diagram of an embodiment of the method for proceeding to manual cooling 85 when the manual cooling mode is selected (from 81). The cooling of the inside of the transport unit includes a manual selection 90 by a user, via for example the TRS controller, to cool the inside of the transport unit by using a first cooling type (C1), and another manual selection 92 to cool the inside of the transport unit by using a second cooling type (C2). The user can select both 90, 92 to cool the TRS by using both of the first and cooling types. Selecting 90 the first cooling type cools 93 by directing a refrigerant fluid through a refrigeration circuit and/or an eutectic device of the TRS. Selecting 92 the second cooling type cools 94 by directing a cooling fluid, such as cryogen, through a second cooling fluid circuit of the TRS, for cooling an eutectic device. Selecting both 90, 92 of the first and second cooling types cools 93, 94 the TRS by directing the refrigerant fluid through the first cooling fluid circuit of the TRS, and directing the cooling fluid through the second cooling fluid circuit of the TRS.

Figure 8:
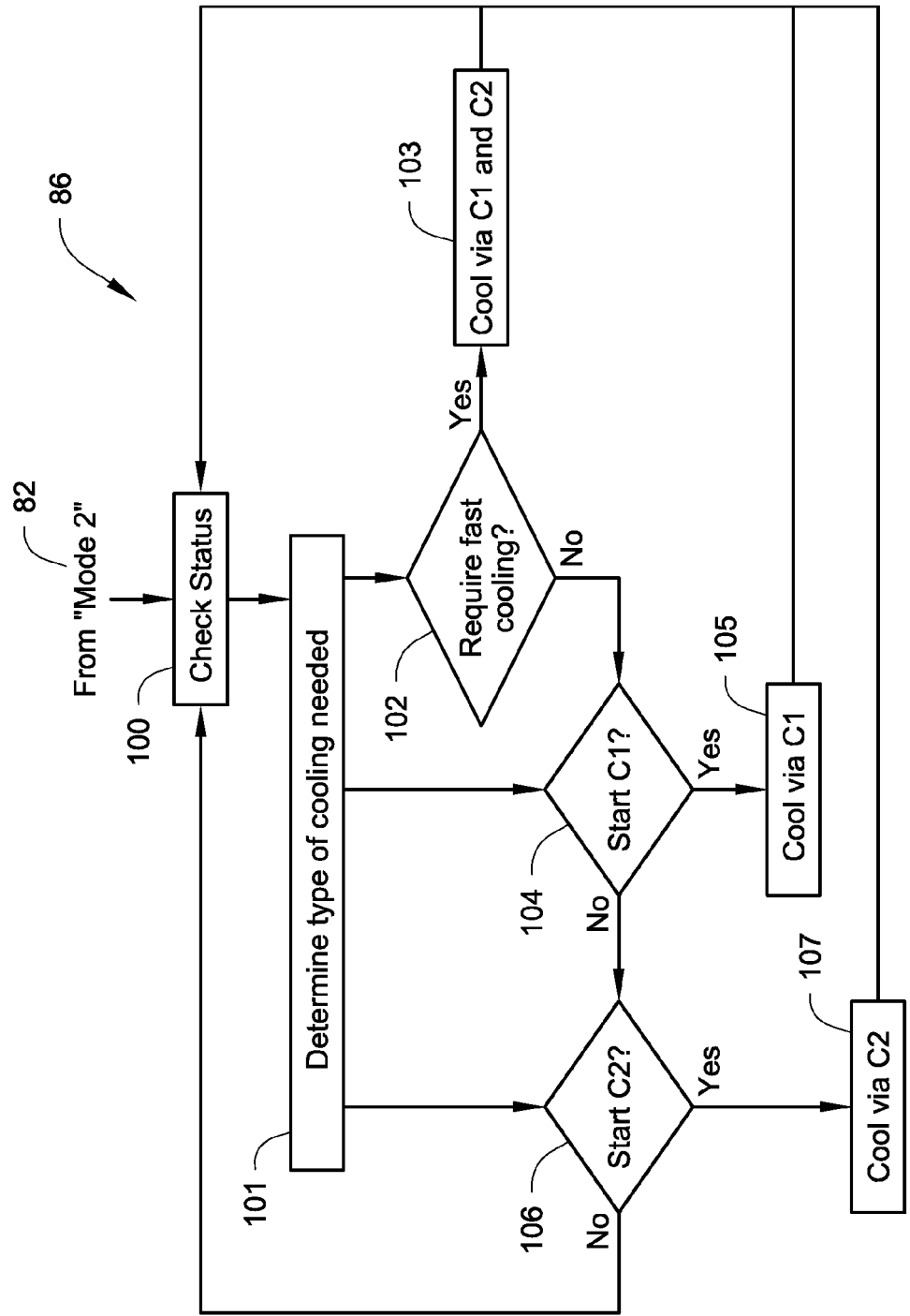
FIG. 8 shows a flow diagram according to an embodiment of a part of the method for controlling a hybrid cooling system.

FIG. 8 shows a flow diagram of an embodiment of the method for proceeding to automatic cooling 86 when the automatic cooling mode is selected (from 82). The cooling of the inside of the transport unit includes the TRS controller checking the status 100 of the TRS, and the TRS controller automatically selecting a cooling type 101 based on the status of the TRS.

The automatic cooling 86 can be based on the status of the TRS, such as a difference between a desired (or set) temperature of the transport unit and the current ambient temperature, a difference between a desired (or set) temperature of the transport unit and the temperature of the returned air, and/or desired operation of the TRS (e.g. high speed cooling, low speed cooling, defrosting, etc.).

If the TRS controller determines, based on the status of the TRS, that fast cooling is required 102, then a cooling 103 the TRS includes directing a refrigerant fluid through the TRU and directing a cooling fluid through an eutectic device of the TRS. Thus, the TRU of the eutectic device can operate to cool the cargo space. If the TRS controller determines, based on the status of the TRS, that a first cooling type is required 104, then a cooling 105 the TRS includes directing a refrigerant fluid through a refrigerant circuit of the TRU. If the TRS controller determines, based on the status of the TRS, that a second cooling type is required 106, then a cooling 107 the TRS includes directing a cooling fluid, such as a cryogen, through a cooling fluid circuit connected to an eutectic device of the TRS.

Figure 9:
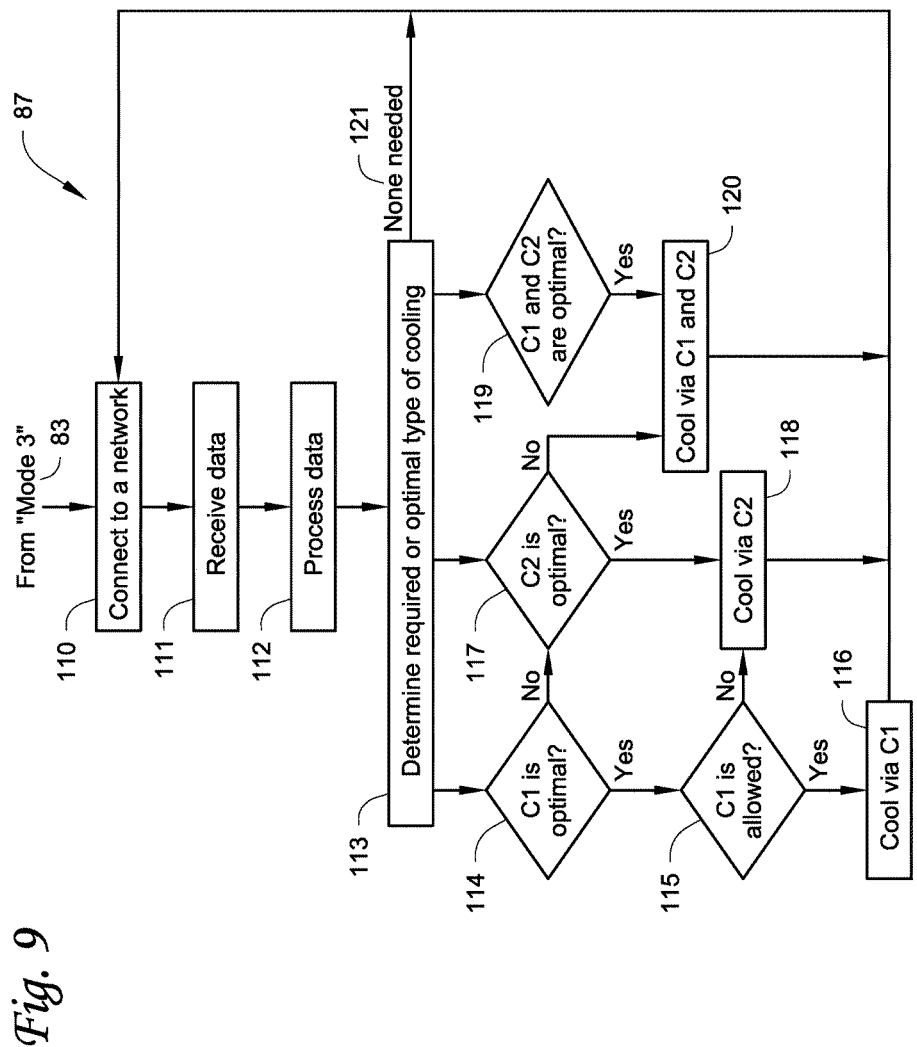
FIG. 9 shows a flow diagram according to an embodiment of a part of the method for controlling a hybrid cooling system.

FIG. 9 shows a flow diagram of an embodiment of the method for proceeding to dynamic cooling 87 when the dynamic cooling mode is selected (from 83). The cooling of the inside of the transport unit includes the TRS controller connecting 110 to a network. Examples of the network include, but are not limited by, wireless network, cellular network, GPS network, satellite network, WiFi, 3G, 4G, LTE, and/or a combination thereof. After the TRS controller is connected 110 to the network, the TRS controller receives 111 data via the network. The data can include position information based on the Global Positioning Satellite data, weather condition data, local ordinances at the location of the TRS controller (e.g. sound level/noise regulations, and environmental regulations), a difference between a desired set temperature and the ambient temperature, a difference between a desired set temperature and the temperature of the returned air, a distance to the next scheduled stop, current traffic conditions, speed of the tractor transporting the transport unit, route position, etc.

The TRS controller then processes 112 the data and transforms the data into TRS control information. Then the TRS controller determines 113 a cooling type based on the TRS control information.

If the TRS controller determines that a first cooling type 114 which directs a refrigerant fluid through the refrigerant circuit of the TRU and/or the eutectic device is optimal based on a portion of the TRS control information, the TRS controller also determines whether the first cooling type is allowable 115 based on the TRS control information. For example, the first cooling type can cause a certain level of sound to generate from a TRU (e.g., sound caused by a compressor in the TRU). The TRU includes a refrigerant fluid flowing through a refrigerant circuit, which has the compressor, a condenser, an expansion valve, and an evaporator. Although using the TRU for cooling may be a desired method of cooling the TRS, the local ordinance where the TRS controller is located may not allow that level of sound. For example, in some cities, based on the time of day, there are ordinances that regulate noise pollution. As such, the operation of the compressor in the TRU may violate that noise pollution ordinance when the compressor in the TRU is turned on at that particular time of the day. The TRS control information is based on such data received from the network and the TRS controller operates the TRS such that such violation of the ordinance would not occur. Accordingly, if the TRS controller determines that the first cooling type is allowable based on the TRS control information, then the TRS controller directs 116 the refrigerant fluid through the TRS. If the TRS controller determines that the first cooling type is not allowable based on the TRS control information, then another cooling type is used, if at all. The another cooling type can be a second cooling type which directs a cooling fluid through a cooling circuit that is in contact with an eutectic device of the TRS. Advantageously, the second cooling type is substantially quieter than the first cooling type, so that cooling via the second cooling type would not violate the same noise pollution control ordinance. Thus, the transport unit can be cooled even when the TRU cannot operate due to the local ordinance and/or time of day.

If the TRS controller determines that a second cooling type 117 which directs a cooling fluid through a cooling circuit that is in contact with an eutectic device of the TRS is optimal based on the TRS control information, then the TRS controller directs 118 the cooling fluid through a cooling circuit that is in contact with an eutectic device of the TRS.

If the TRS controller determines that the first cooling type and the second cooling type are to be used together 119, for example, for optimally cooling the transport unit as quickly as possible, the TRS controller directs the refrigerant fluid through a refrigerant circuit of the TRU and/or through a refrigerant circuit of an eutectic device of the TRS, and directs the cooling fluid through a cooling fluid circuit to cool the eutectic device, for cooling 120 the transport unit.

If the TRS controller determines that cooling the TRS is not needed 121, then the TRS controller does not direct the refrigerant fluid through the first fluid circuit of the TRS, and does not direct the cooling fluid through the second fluid circuit of the TRS.

Figure 10:
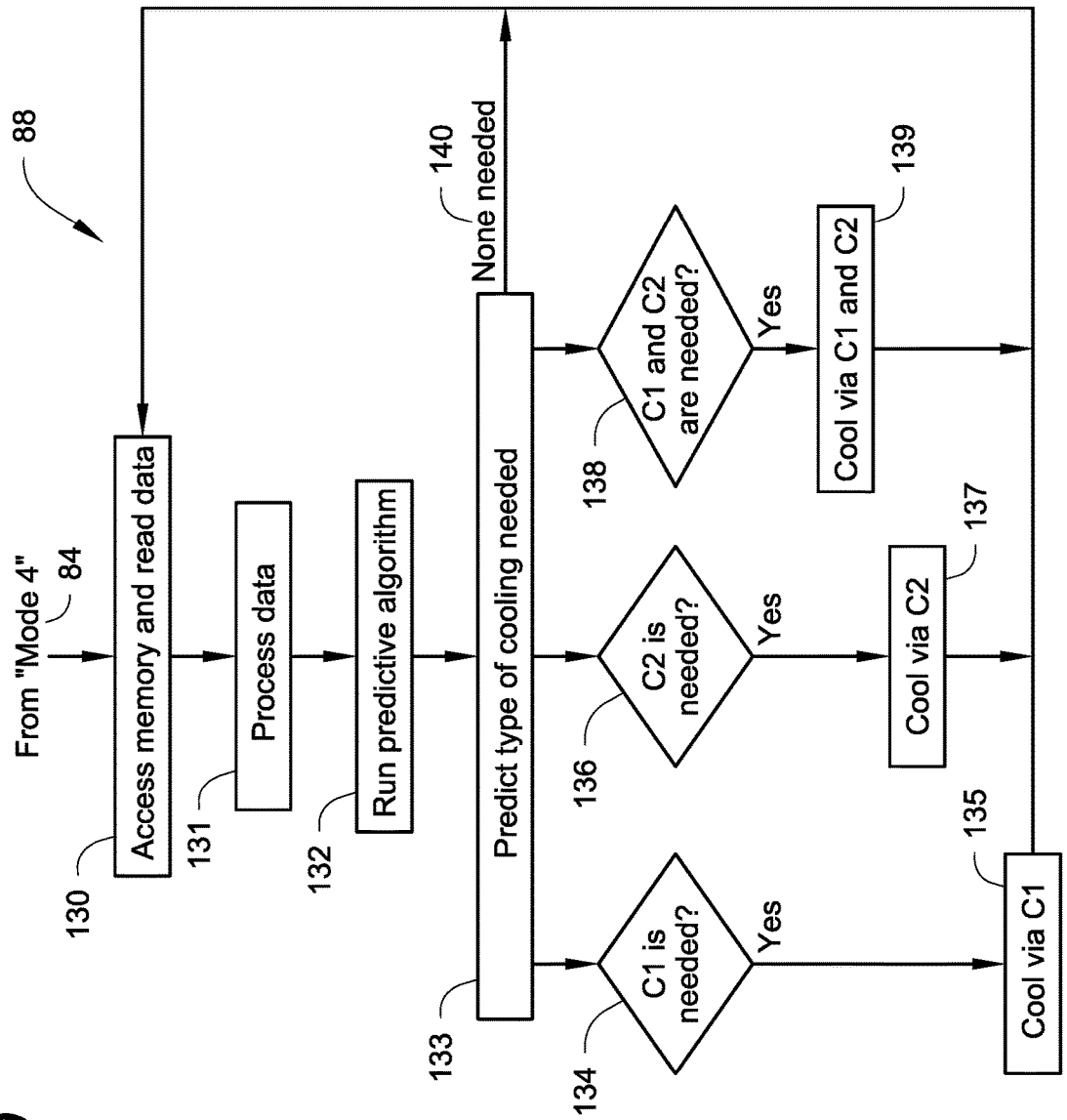
FIG. 10 shows a flow diagram according to an embodiment of a part of the method for controlling a hybrid cooling system.

FIG. 10 shows a flow diagram of an embodiment of the method for proceeding to preset cooling 88 when the preset cooling mode is selected (from 84).

The cooling the inside of the transport unit includes the TRS controller accessing 130 a memory to read data stored therein. The data can be a route map data, a time based data, or other data that have been predetermined for operating the TRS. The TRS controller then processes 131 the data and a processor of the TRS controller executes and/or runs 132 a predictive algorithm using the data. The predictive algorithm can consider, for example, but not limited to, a difference between a desired set temperature and the ambient temperature, a difference between a desired set temperature and the temperature of the returned air, a distance to the next scheduled stop, traffic condition, speed of the tractor transporting the transport unit, route position, etc.

Then, the TRS controller predicts 133 a cooling type needed by running a predictive algorithm. Then, a cooling type is selected 134, 136, 138, 140.

The TRS controller can select 134 to direct a refrigerant fluid through a refrigeration circuit and/or an eutectic device of the TRS, and then the TRS controller cools 135 the transport unit via directing the refrigerant fluid through the TRU and/or the eutectic device.

The TRS controller can select 136 to direct a cooling fluid through a cooling fluid circuit that is in thermal contact with an eutectic device of the TRS, and then the TRS controller cools 137 via directing the cooling fluid through the cooling fluid circuit.

The TRS controller can select 138 to direct the refrigerant fluid through the TRU, and also to direct the cooling fluid through the cooling fluid circuit that is in thermal contact with the eutectic device of the TRS. Then, the TRS controller cools 139 the transport unit via directing the refrigerant fluid through the refrigerant circuit of the TRU, and directing the cooling fluid through the cooling fluid circuit to cool the eutectic device of the TRS.

The TRS controller can select 140 that cooling the TRS is not needed. Then, the TRS controller does not direct the refrigerant fluid through the refrigerant circuit of the TRU, and does not direct the cooling fluid through the cooling fluid circuit of the TRS.

Aspects

It is noted that any of the features in any of the aspects below can be combined with any of the other aspects.

Aspect 1. A method for controlling a transportation refrigeration system (TRS), wherein the TRS includes a TRS controller connected to the TRS for operating the TRS, an eutectic device including an eutectic medium, a transport refrigeration unit (TRU) having a refrigerant circuit for directing a refrigerant fluid through the TRU and capable of directing the refrigerant fluid to the eutectic device for cooling the eutectic medium, and a cooling fluid circuit in thermal contact with the eutectic medium, the cooling fluid circuit configured to direct a cooling fluid to be in thermal contact with the eutectic medium, the method comprising:
the TRS controller receiving a selection of a cooling mode for the TRS; and
cooling an inside of a transport unit according to the cooling mode selected, wherein the cooling includes one or more of:
directing the refrigerant fluid through the TRU according to the cooling mode selected,
directing the refrigerant fluid to the eutectic device according to the cooling mode selected, and
directing a cooling fluid through the cooling fluid circuit to cool the eutectic device according to the cooling mode selected.

Aspect 2. The method according to aspect 1, wherein the cooling mode for the TRS includes:
a manual cooling mode, wherein a cooling type of the TRS is based on a selection made by a user via the TRS controller;
an automatic cooling mode, wherein the cooling type of the TRS is automatically set by the TRS controller;
a dynamic cooling mode, wherein the cooling type of the TRS is based on dynamic information received by the TRS controller; and
a preset cooling mode, wherein the cooling type of the TRS is based on a predetermined information stored at the TRS controller.

Aspect 3. The method according to any of the aspect 2, wherein the TRS controller receiving the selection of the cooling mode includes, the TRS controller receiving a selection of one or more of:
the manual cooling mode to select the cooling type;
the automatic cooling mode to have the TRS controller automatically set the cooling type;
the dynamic cooling mode to have the TRS controller set the cooling type based on the dynamic information; and
the preset cooling mode to have the TRS controller set the cooling type based on the predetermined information.

Aspect 4. The method according to aspect 3, when the TRS controller receiving the selection of the manual cooling mode, the cooling the inside of the transport unit includes:
cooling via a first cooling type, the first cooling type including directing the refrigerant fluid through the refrigerant circuit of the TRS; and
cooling via a second cooling type, the second cooling type including directing the cooling fluid through the cooling fluid circuit of the TRS.

Aspect 5. The method according to any of aspects 3-4, when the TRS controller receiving the selection of the automatic cooling mode, the cooling the inside of the transport unit includes:
checking a status of the TRS;
automatically selecting a cooling type based on the status of the TRS, wherein a first cooling type directs the refrigerant fluid through the cooling fluid circuit, a second cooling type directs the cooling fluid through the eutectic device, and a third cooling type directs the refrigerant fluid through the TRU and directs the cooling fluid through the eutectic device; and
the cooling includes cooling according to the cooling type selected.

Aspect 6. The method according to any of aspects 3-5, when the TRS controller receiving the selection of the dynamic cooling mode, the cooling the inside of the transport unit includes:
the TRS controller connecting to a network;

the TRS controller receiving data via the network;
the TRS controller processing the data and transforming the data to TRS control information; and
the TRS controller determining a cooling type based on the TRS control information; and
cooling according to the TRS control information.

Aspect 7. The method according to aspect 6, wherein
the TRS controller determining the cooling type includes the TRS controller determining whether a first cooling type, the first cooling type directing the refrigerant fluid through the TRU, is allowable based on the TRS control information; and
the cooling includes cooling via the first cooling type if the first cooling type is determined to be allowable based on the TRS control information, and cooling via a second cooling type, the second cooling type directing the cooling fluid through the eutectic device, if the first cooling type is determined to be not allowable based on the TRS control information.

Aspect 8. The method according to any of the aspects 6-7, wherein
the TRS controller determining the cooling type includes the TRS controller determining to direct the cooling fluid through the eutectic device; and
the cooling includes directing the cooling fluid through the eutectic device of the TRS.

Aspect 9. The method according to any of the aspects 6-8, wherein
the TRS controller determining the cooling type includes the TRS controller determining to direct the refrigerant fluid through the refrigerant circuit, and to direct the cooling fluid through the cooling fluid circuit to cool the eutectic device of the TRS; and
the cooling includes directing the refrigerant fluid through the refrigerant circuit, and directing the cooling fluid through the cooling fluid circuit to cool the eutectic device.

Aspect 10. The method according to any of the aspects 6-9, wherein
the TRS controller determining the cooling type includes the TRS controller determining that cooling the TRU is not needed.

Aspect 11. The method according to any of the aspects 1-10, wherein
the cooling includes the TRS controller not directing the refrigerant fluid through the refrigerant circuit of the TRU, and not directing the cooling fluid through the cooling fluid circuit to cool an eutectic device.

Aspect 12. The method according to any of the aspects 3-6, the TRS controller receiving the selection of the dynamic cooling mode, the cooling the inside of the transport unit includes:
the TRS controller accessing a memory to read data stored therein;
the TRS controller processing the data;
the TRS controller selecting a cooling type by running a predictive algorithm using the data; and
cooling via the cooling type selected.

Aspect 13. The method according to aspect 12, wherein
the TRS controller selecting the cooling type includes the TRS controller selecting to direct the refrigerant fluid through the TRS; and
the cooling includes directing the refrigerant fluid through the TRS.

Aspect 14. The method according to any of the aspects 12-13, wherein
the TRS controller selecting the cooling type includes the TRS controller selecting to direct the cooling fluid through the cooling fluid circuit that is in thermal contact with the eutectic device of the TRS; and
the cooling includes directing the cooling fluid through the cooling fluid circuit.

Aspect 15. The method according to any of the aspects 12-14, wherein
the TRS controller selecting the cooling type includes the TRS controller selecting to direct the refrigerant fluid through the refrigerant circuit of the TRU, and to direct the cooling fluid through the cooling fluid circuit to cool the eutectic device; and
the cooling includes directing the refrigerant fluid through the refrigerant circuit of the TRU, and directing the cooling fluid through the cooling fluid circuit to cool the eutectic device of the TRS.

Aspect 16. The method according to any of the aspects 12-15, wherein
the TRS controller selecting the cooling type includes the TRS controller selecting that cooling the TRS is not needed.

Aspect 17. The method according to any of the aspects 1-16, wherein
the cooling includes the TRS controller not directing the refrigerant fluid through the refrigerant circuit of the TRU, and not directing the cooling fluid through the cooling fluid circuit.

Aspect 18. A non-transitory computer-readable medium having computer-readable instructions that when executed by a processor performs the method for controlling a TRS according to any of the aspects 1-17.

Aspect 19. A controller for controlling a transportation refrigeration system (TRS), wherein the TRS includes an eutectic device including an eutectic medium, a transport refrigeration unit (TRU) having a refrigerant circuit for directing a refrigerant fluid through the TRU and capable of directing the refrigerant fluid to the eutectic device for cooling the eutectic medium, and a cooling fluid circuit in thermal contact with the eutectic medium, the cooling fluid circuit configured to direct a cooling fluid to be in thermal contact with the eutectic medium, the controller comprising:
a network interface for connecting to a network;
a processor connected to the network interface for receiving data from the network;
a user interface connected to the processor; and
a non-transitory computer-readable memory connected to the processor, the non-transitory computer-readable memory having computer-readable instructions that when executed by the processor performs the method for controlling the TRS according to any of the aspects 1-17.

Aspect 20. A transportation refrigeration system (TRS), comprising:
an eutectic device including an eutectic medium;
a transport refrigeration unit (TRU) having a refrigerant circuit for directing a refrigerant fluid through the TRU and capable of directing the refrigerant fluid to the eutectic device for cooling the eutectic medium; and
a cooling fluid circuit in thermal contact with the eutectic medium, the cooling fluid circuit configured to direct a cooling fluid to be in thermal contact with the eutectic medium; and
a TRS controller configured to control the TRS, the TRS controller including:
a network interface for connecting to a network;

a processor connected to the network interface for receiving data from the network;
a user interface connected to the processor; and
a non-transitory computer-readable memory connected to the processor, the non-transitory computer-readable memory having computer-readable instructions that when executed by the processor performs the method for controlling the TRS according to any of the aspects 1-17.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method for controlling a transportation refrigeration system (TRS), wherein the TRS includes a TRS controller connected to the TRS for operating the TRS, a eutectic device including a eutectic medium, a transport refrigeration unit (TRU) having a refrigerant circuit for directing a refrigerant fluid through the TRU and capable of directing the refrigerant fluid to the eutectic device for cooling the eutectic medium, and a cooling fluid circuit in thermal contact with the eutectic medium, the cooling fluid circuit configured to direct a cooling fluid to be in thermal contact with the eutectic medium, the method comprising:
   the TRS controller receiving a selection of a cooling mode for the TRS; and
   cooling an inside of a transport unit according to the cooling mode selected, wherein the cooling includes one of:
      a first cooling type, the first cooling type including powering a compressor of the refrigeration circuit for directing the refrigerant fluid through a condenser, an expansion valve and an evaporator of the refrigerant circuit to provide cooling inside the transport unit without the eutectic device;
      a second cooling type, the second cooling type including directing the cooling fluid through the cooling fluid circuit of the TRS to cool the eutectic medium for the eutectic device to provide cooling inside the transport unit without the refrigeration circuit; and
      a third cooling type, the third cooling type including both:
         powering a compressor of the refrigeration circuit for directing the refrigerant fluid through a condenser, an expansion valve and an evaporator of the refrigerant circuit, and
         directing the cooling fluid through the cooling fluid circuit of the TRS to cool the eutectic medium for the eutectic device
   to provide cooling inside the transport unit;
   wherein instructions to carry out the first cooling type, the second cooling type, and the third cooling type are stored within a memory;
   wherein the cooling mode for the TRS includes:
   a manual cooling mode, wherein a user selects, via the TRS controller, one of the first cooling type, the second cooling type, and the third cooling type;
   an automatic cooling mode, wherein the TRS controller selects one of the first cooling type, the second cooling type, and the third cooling type based on a current status of the TRS, wherein the current status of the TRS is determined based on information sent to the TRS controller from one or more components of the TRS;
   a dynamic cooling mode, wherein the TRS controller selects one of the first cooling type, the second cooling type, and the third cooling type based on information received by the TRS controller from an external device via a network; and
   a preset cooling mode, wherein the TRS controller selects one of the first cooling type, the second cooling type, and the third cooling type based on predetermined TRS operation information stored in memory.

2. The method according to claim 1, wherein when the TRS controller receives the selection of the dynamic cooling mode, the cooling the inside of the transport unit while the TRS operates in the dynamic cooling mode includes:
   the TRS controller connecting to the network;
   the TRS controller receiving data via the network;
   the TRS controller processing the data and transforming the data to TRS control information; and
   the TRS controller selecting one of the first cooling type, the second cooling type, and the third cooling type based on the TRS control information.

3. The method according to claim 2, wherein the cooling includes cooling via the first cooling type or the third cooling type if the first cooling type is determined to be allowable based on the TRS control information, and cooling via the second cooling type when the first cooling type is determined to be not allowable based on the TRS control information.

4. The method according to claim 2, further comprising prior to selecting one of the first cooling type, the second cooling type, and the third cooling type, the TRS controller determining whether the cooling is needed based on the TRS control information, and the TRS controller selecting one of the first cooling type, the second cooling type, and the third cooling type when the TRS controller determines that cooling is needed.

5. The method according to claim 4, further comprising the TRS controller not directing the refrigerant fluid through the refrigerant circuit of the TRU for the first cooling type and not directing the cooling fluid through the cooling fluid circuit to cool the eutectic device for the second cooling type when the TRS controller determines that cooling is not needed based on the TRS control information.

6. The method according to claim 1, wherein in response to the TRS controller receiving the selection of the dynamic cooling mode, the cooling the inside of the transport unit includes:
   the TRS controller accessing a memory to read data stored therein;
   the TRS controller processing the data; and
   the TRS controller selecting one of the first cooling type, the second cooling type, and the third cooling type by running a predictive algorithm using the data.

7. The method according to claim 6, further comprising prior to selecting one of the first cooling type, the second cooling type, and the third cooling type, the TRS controller determining whether cooling is needed based on the predictive algorithm.

8. The method according to claim 6, further comprising the TRS controller not directing the refrigerant fluid through the refrigerant circuit of the TRU for the first cooling type and not directing the cooling fluid through the cooling fluid circuit for the second cooling type when the TRS controller determines that cooling is not needed based on the predictive algorithm.

9. The method according to claim 1, wherein the cooling includes an additional cooling type, the additional cooling type includes directing the refrigerant fluid through the eutectic medium of the eutectic device to cool the eutectic medium for the eutectic device to provide cooling inside the transport unit.

* * * * *